United States Patent [19]

Shinohara

[11] Patent Number: 4,964,704
[45] Date of Patent: Oct. 23, 1990

[54] OPTICAL SYSTEM FOR USE OF A LASER PROCESSING MACHINE

[75] Inventor: Hisato Shinohara, Sagamiwara, Japan

[73] Assignee: Semiconductor Energy Laboratory Co., Ltd., Atsugi, Japan

[21] Appl. No.: 395,153

[22] Filed: Aug. 17, 1989

Related U.S. Application Data

[63] Continuation of Ser. No. 188,457, Apr. 29, 1988, abandoned.

[30] Foreign Application Priority Data

May 1, 1987 [JP] Japan ................................ 62-108674

[51] Int. Cl.$^5$ ................................................ G02B 3/06
[52] U.S. Cl. .................................................. 350/433
[58] Field of Search ........................ 350/433, 469, 474

[56] References Cited

U.S. PATENT DOCUMENTS 4,043,641 8/1977 Gottlieb ............................. 350/433

FOREIGN PATENT DOCUMENTS 0021016 2/1985 Japan .................................. 350/469

Primary Examiner—Rodney D. Bovernick
Assistant Examiner—Rebecca D. Gass
Attorney, Agent, or Firm—Sixbey, Friedman, Leedom & Ferguson

[57] ABSTRACT

An improved optical system suitable for laser processing in semiconductor manufacture. The system is composed of three convex lenses. By suitably selecting the type of each of the lenses, a limited spherical aberration is obtained without compromising the numerical aperture.

6 Claims, 5 Drawing Sheets

F I G. 5 (A)
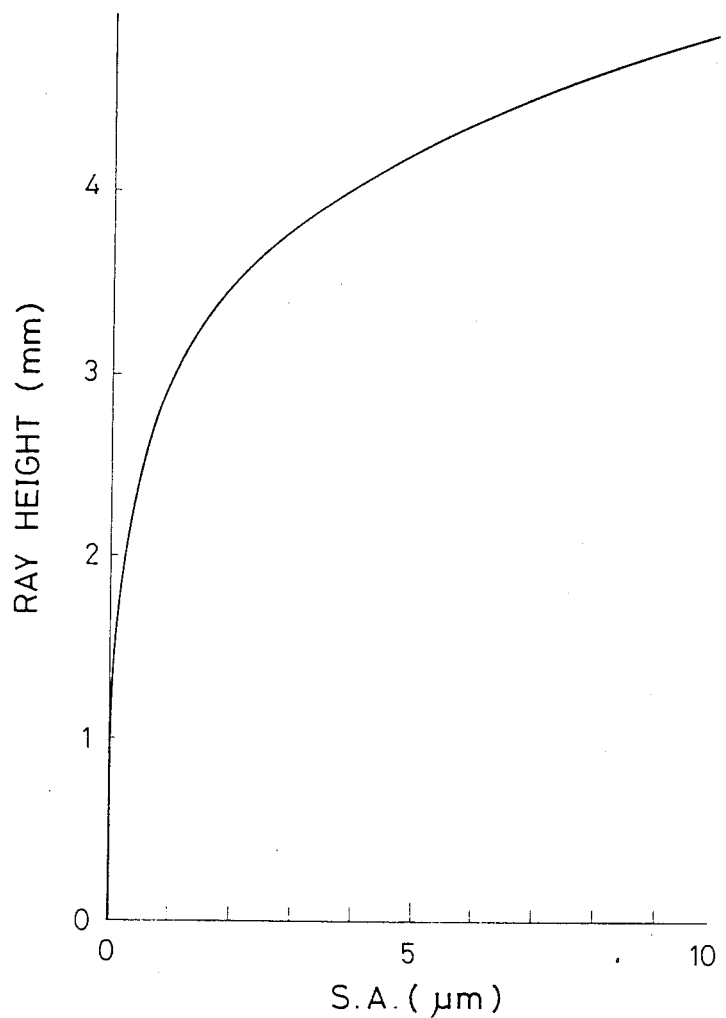

F I G. 5 (B)
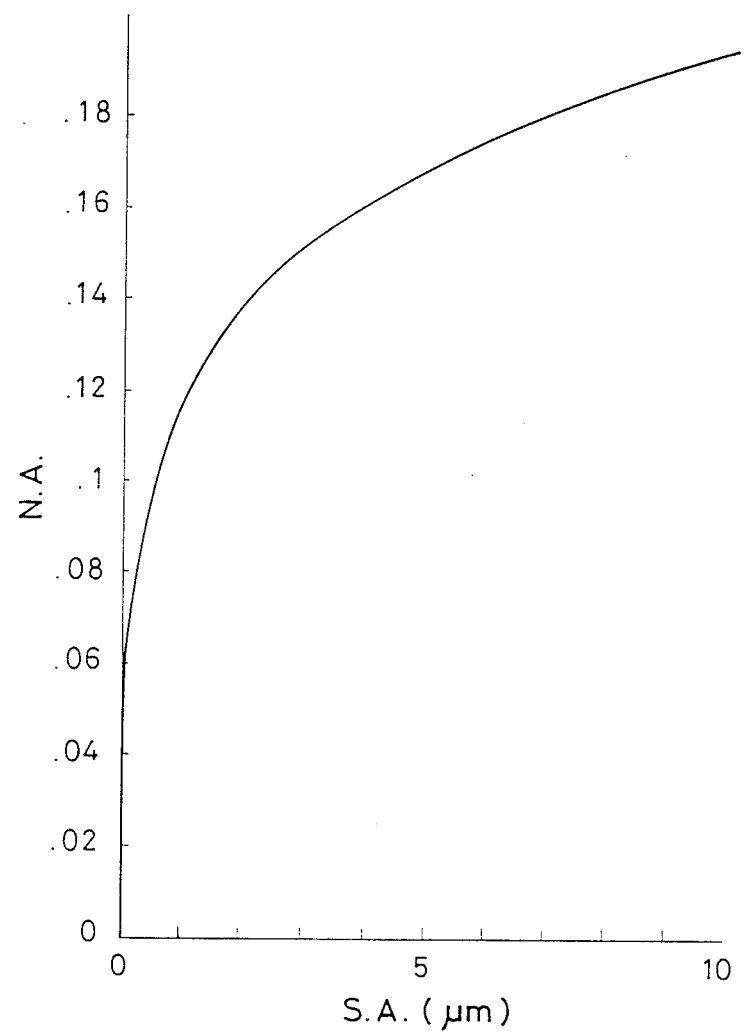

OPTICAL SYSTEM FOR USE OF A LASER PROCESSING MACHINE

This application is a Continuation of Ser. No. 07/188,457, filed 4/29/88, now abandoned.

BACKGROUND OF THE INVENTION

This invention relates to an optical system for use of laser processing machine.

Recently, laser scribing has been attracting the interest of researchers in the field of electronic device manufacture. There are two kinds of processes which can be employed to produce patterns on thin films by irradiating with a laser beam. According to one process, a laser beam is shaped by a mask in advance of being focussed to the film through an optical system, so that the film is processed in accordance with the image determined by the mask. By virtue of the optical system, the focussed beam comes to have a necessary energy density to process the film. The optical system is normally composed of spherical lenses. According to the other process, an optical system is utilized to squeeze an orignial laser beam into a narrow beam having a prescribed spot cross section with its sufficient energy density. By repeating the irradiation of a spot laser beam while the irradiation position on the film is shifted with respect to the laser beam, a groove can be engraved. Spherical lenses are also suitable for this case. However, objective lenses for microscope can be used, the wavelength of the laser beam permitting.

Usually, such an optical system is comprised of a plurality of spherical lenses having different focal lengths in order to obtain a small aberration without compromising the numerical aperture of the lenses.

On the other hand, a laser beam can be shaped into a flat thin beam having a linear cross section by making use of a cylindrical lense while the cross section area of the beam is expanded if necessary. In this case, a single lense is employed which comprises an incidence side convex surface and an opposing outlet side convex surface whose curvature is smaller than that of the incidence surface. The spherical aberration is limited in light of such a configuration.

However, when a large numerical aperture is desired, the spherical aberration has to be compromised.

SUMMARY OF THE INVENTION

It is therefore an object of the invention to provide an optical system having a large numerical aperture without compromising the aberration. For example, the numerical aberration is larger than 0.0015. The inventor has found a desired condition that should be satisfied by the constituent lenses of the optical system to suppress the spherical aberration with a relatively large numerical aperture. In accordance with the present invention, an optical system for use of a laser processing machine, comprises first, second and third optical lens means arranged in this order, each lens means being equivalent to a lense which comprises a convex surface in the light incidence side and a flat or concave surface whose curvature is larger than that of the convex surface, wherein the curvature in the incidence side of the equivalent lense corresponding to the third optical lens means is less than that of the second optical lens means. The laser beam may be used for weapon.

BRIEF DESCRIPTION OF THE INVENTION

Figure 4:
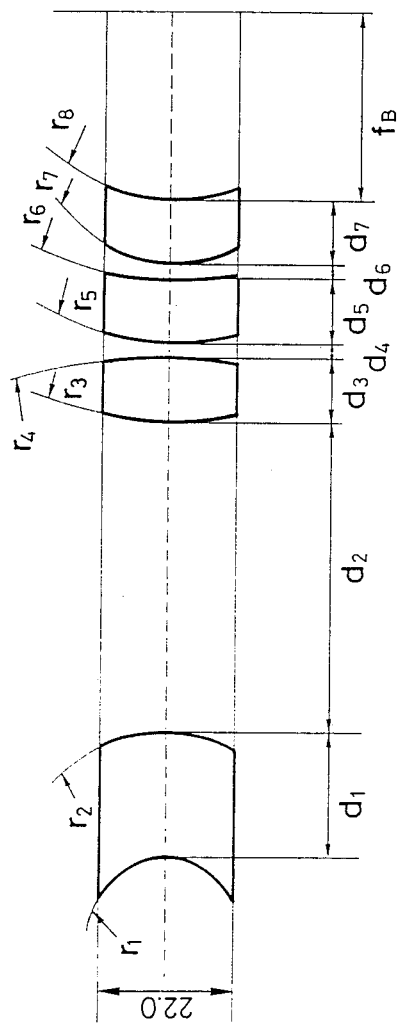
FIG. 4 is a schematic diagram showing another optical system in accordance with the present invention.

FIGS. 5(A) and 5(B) are graphical diagrams showing the spherical aberration of the optical system illustrated in FIG. 4.

DETAILED DESCRIPTION OF THE PREFERRED EMBODIMENTS

Figure 1:
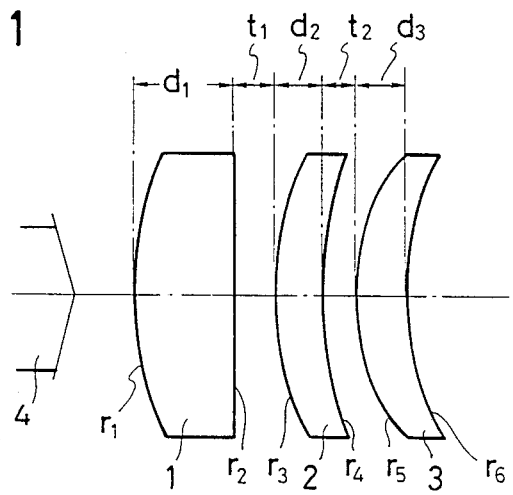
FIG. 1 is a schematic diagram showing an optical system in accordance with the present invention.

Referring to FIG. 1, a first embodiment of the optical system in accordance with the present invention is illustrated. The system is composed of a first lense 1, a second lense 2 and a third lense 3, each being cylindrical lense made of an artificial quartz. The length of each lense in the axial direction is 440 mm. In the figure, $r_1$ ($=91.0$ mm). $r_3$ ($=44.0$ mm) and $r_5$ ($=22.7$ mm) denote the radius of curvature at the incidence side surfaces of the respective lenses; $r_2$ ($=532.0$ mm), $r_4$ ($=113.0$ mm) and $r_6$ ($=27.8$ mm) denote the radius of curvature at the outlet side surfaces of the respective lenses; $d_1$ ($=10.0$ mm), $d_2$ ($=10.0$ mm) and $d_3$ ($=10.0$ mm) denote the thickness of the respective lenses; $t_1$ ($=10.0$ mm) and $t_2$ ($=2.0$ mm) denote the distance between the lenses 1 and 2 and the distance between the lenses 2 and 3. The focal length and the back focussing distance of the system are 49.69 mm and 27.75 mm.

This arrangement of lenses has been determined in the following manner. Namely, the second lense 2 is disposed between the outlet surface of the first lense 1 and the focus of the first lense 1 alone; then the third lense 3 is disposed between the outlet of the second lense 2 and the focus of the combination of the first and the second lenses 1 and 2. The thicknesses of the lenses are determined in accordance with the maximum height of the incident laser beam. The distances between the lenses are preferably short from the view point of the focal length.

Figure 2:
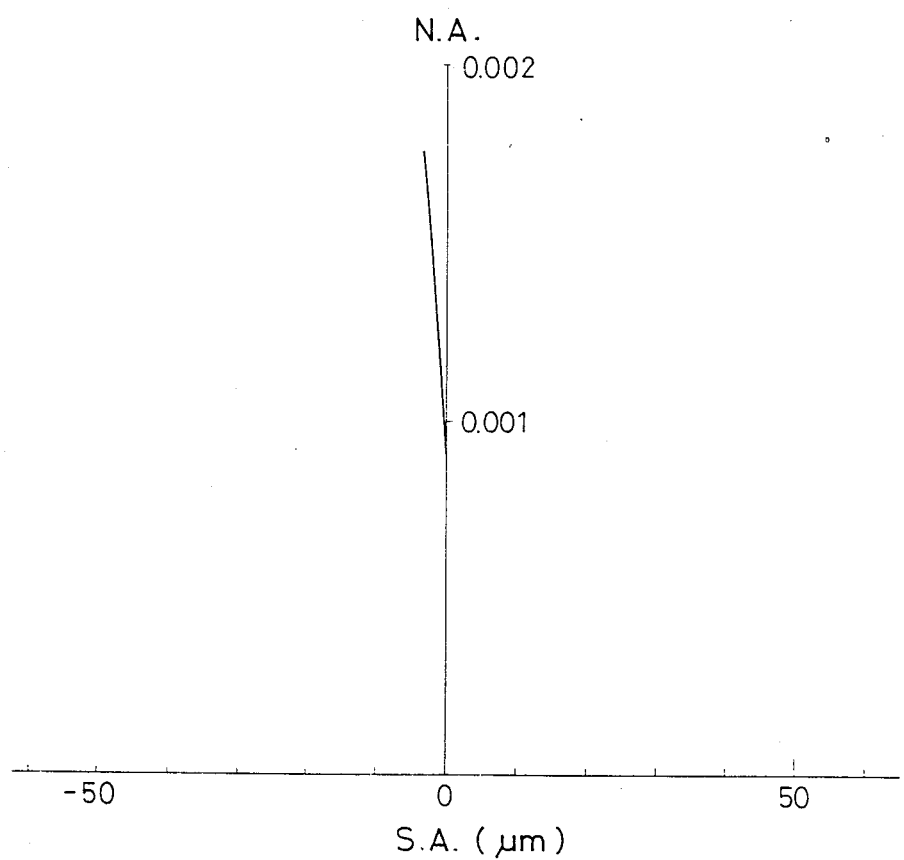
FIG. 2 is a graphical diagram showing the spherical aberration of the optical system illustrated in FIG. 1.

In accordance with an experiment, a laser beam emitted from an eximer laser with 0.4 mm in radius and 248 nm in wavelength was shaped to have a cross section of 400 mm $\times 20$ microns at the focus plane by expanding with a beam expander into a parallel beam and passing through the optical system. FIG. 2 is a graphical diagram showing the aberration of that final laser beam. Consequently, obtained is an improved optical system simultaneously having a numerical aperture of 0.0018 and a limited aberration.

Figure 3:
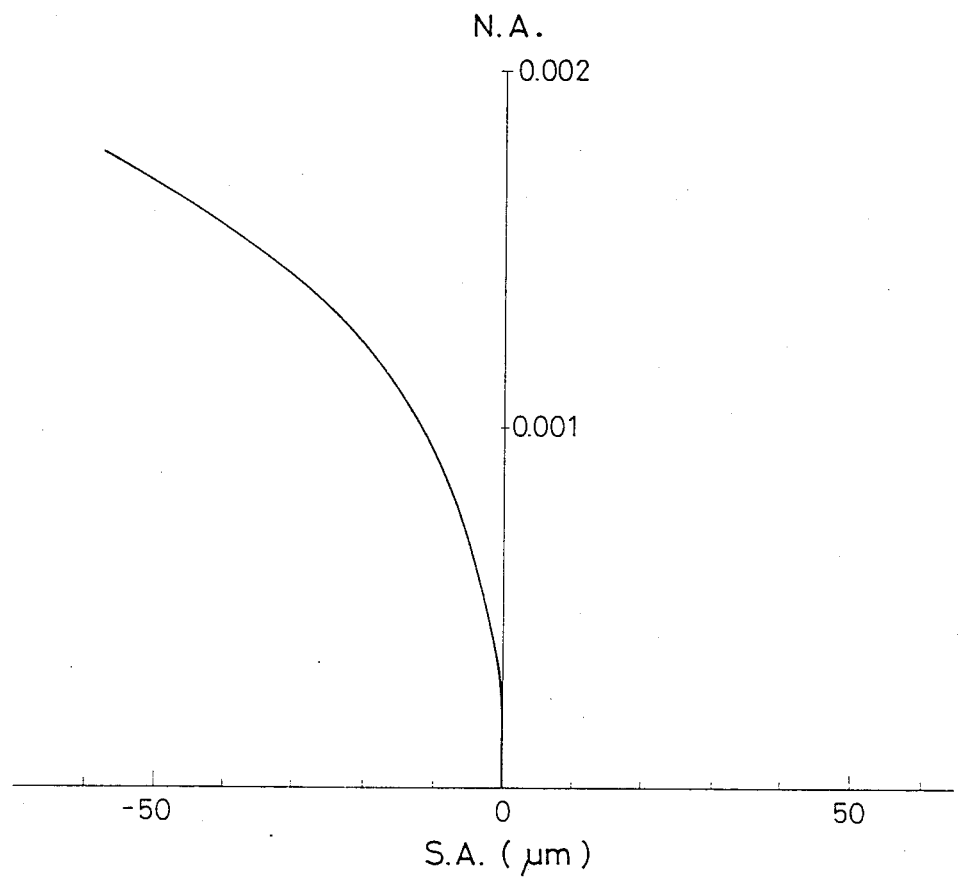
FIG. 3 is a graphical diagram showing the spherical aberration of a convetional optical system.

For reference, the aberration of a conventional optical system consist of one cylindrical lense having a numerical aperture of 0.0018 is shown in FIG. 3. The radius of curvature at the incidence side surface was 25.24 mm while the opposed outlet side surface is flat. The refractive index is 1.50828. The thickness of the lense is 10.0 mm.

In the above description, the optical system is composed of three types of lenses, each type being just a single lense. As easily understood by those skilled in the art, however, each lense can be replaced by an equivalent optical system consisting of a plurality of lenses whose characteristics are consistent with the curvatures and the thickness of that lense.

Referring now to FIG. 4, a second embodiment in accordance with the present invention is illustrated. The optical system includes a concave lense 14 in the incidence side, associated with three convex lenses 11, 12 and 13. The function of the concave lense 14 is to widen the back focussing distance ($f_B$). The $f_B$ increases in proportion to the height of the incident light which increases in the light of concave lense. The $f_B$ 30.11 mm while the focal length is 24.995 mm. The spherical abberration versus the ray height and the numerical aperture of the optical system illustrated in FIG. 4 are plotted in FIGS. 5(A) and 5(B).

While a description has been made for several embodiments, the present invention should be limited only by the appended claims and should not be limited by the particular examples.

I claim:

1. An optical system for use with a laser processing machine comprising at least:

first, second and third optical lens means arranged in this order from the light incidence side, each lens means having the same function as a lens comprising a front convex surface in the light incidence side and an opposite surface whose radius of curvature is larger than that of said convex surface, wherein the radius of curvature in the incidence side of the lens corresponding to said third optical lens means is less than that of the lens corresponding to said second optical lens means.

2. The optical system of claim 1 wherein said first, second and third optical lens means respectively each have the same function as a cylindrical lens.

3. The optical system of claim 1 wherein the numerical aperture system is larger than 0.0015.

4. The optical system of claim 3 further comprising a fourth optical lens means disposed at the light incidence side of the first optical lens means having the same function as a concave lens disposed at the light incidence side of the first optical lens means.

5. An optical system as in claim 1 where the laser processing machine includes an excimer laser.

6. An optical system as in claim 1 where each of said first, second, and third lens means comprises quartz.

* * * * *